United States Patent
Wegner et al.

(10) Patent No.: US 6,311,246 B1
(45) Date of Patent: Oct. 30, 2001

(54) IC WITH DUAL FUNCTION CLOCK AND DEVICE ID CIRCUIT

(75) Inventors: Glenn A. Wegner, Cupertino; Art Khachaturian, San Jose, both of CA (US)

(73) Assignee: Exar Corporation, Fremont, CA (US)

( * ) Notice: Subject to any disclaimer, the term of this patent is extended or adjusted under 35 U.S.C. 154(b) by 0 days.

(21) Appl. No.: 09/470,904

(22) Filed: Dec. 23, 1999

Related U.S. Application Data

(63) Continuation of application No. 08/923,187, filed on Sep. 4, 1997, now abandoned.

(51) Int. Cl.[7] .................................................. G06F 13/38
(52) U.S. Cl. ..................... 710/126; 710/129; 713/500; 713/600; 713/601
(58) Field of Search .................... 712/10; 710/60, 710/100, 126, 129; 713/1, 100, 500, 502, 600, 601

(56) References Cited

U.S. PATENT DOCUMENTS

| | | | | |
|---|---|---|---|---|
| 5,086,387 | * | 2/1992 | Arroyo et al. | 713/501 |
| 5,410,683 | * | 4/1995 | Al-Khairi | 713/501 |
| 5,481,753 | * | 1/1996 | Miyake et al. | 710/3 |
| 5,706,027 | * | 1/1998 | Hilton et al. | 345/156 |

\* cited by examiner

*Primary Examiner*—Richard Hjerpe
*Assistant Examiner*—Mackly Monestime
(74) *Attorney, Agent, or Firm*—Townsend and Townsend and Crew LLP

(57) ABSTRACT

An integrated circuit in which the address and data inputs for a clock register to program a clock is also used for device ID and revision number. A shadow register is provided which is accessible to output the ID and revision number when (1) the regular clock register is addressed, and (2) a particular data input for activating the shadow register appears on the data input to the clock register.

22 Claims, 3 Drawing Sheets

IC WITH DUAL FUNCTION CLOCK AND DEVICE ID CIRCUIT

This application is a continuation of Ser. No. 08/923,187 filed Sep. 4, 1997 now abandoned.

BACKGROUND OF THE INVENTION

The present invention relates to identifying the device ID and revision number of an integrated circuit, and particularly to providing an electronically readable ID and revision number in a universal asynchronous receiver/transmitter (UART) chip.

Integrated circuit parts are typically identified with a device ID and a revision number. A device ID may distinguish between multiple IC's which are similar, but have different combinations of features corresponding to different price ranges or speeds, for instance. Additionally, each particular product ID may go through multiple revisions. For example, when a bug is discovered in a chip, it can be fixed and a new revision of the chip produced. It is desirable to provide a revision number which can identify the chip to be able to distinguish one revision from another in order to determine which bugs have been fixed.

One method for doing this is to electronically encode a device ID and revision number on the chip itself at a register address, and read it by addressing that register. This method may be viable for a chip, such as a microprocessor, with a large number of address lines and potential register locations.

However, for some other chips, such as a UART chip, there may be only a few address lines (i.e., 3), and thus register space is very limited. In such applications, it is more typical for a label or etching to be placed on the bottom of the chip package. This label can then be visually observed by the user. However, if the chip has been soldered onto a board, this can become problematic.

SUMMARY OF THE INVENTION

The present invention provides an integrated circuit in which the address and data inputs for a clock register to program a clock is also used for device ID and revision number. A shadow register is provided which is accessible to output the ID and revision number when (1) the regular clock register is addressed, and (2) a particular data input for activating the shadow register appears on the data input to the clock register.

In a preferred embodiment, the predetermined data input value is an illegal value not otherwise used. For a clock circuit in which the clock register stores a divide-by value for use in determining the clock frequency, a data value of zero is illegal since the clock speed cannot be divided by zero. Accordingly, a zero value on the data input to the clock register is detected, and used to activate a readout of the shadow register storing the device ID and revision number.

Preferably, the shadow register is programmed during the metalization stage of manufacture of the integrated circuit. In one embodiment, the clock register, or divide-by register, has two 8-bit register locations. The shadow register also has two 8-bit locations, with the device ID being stored in one 8-bit value, and the revision number in the other.

In an alternate embodiment, the shadow register output is not connected to a data output at all, but rather is connected to the clock circuit through a multiplexer. The multiplexer is activated to select the shadow register contents upon detection of a reset signal. Thus, when a reset is received, the clock will initially have a frequency corresponding to the revision number and device ID. Thus, by doing a calculation on the clock frequency, the value used to program it can be determined, and the device ID and revision number determined. When the user reprograms the clock register after reset, the multiplexer will again be switched to use the clock register value to produce the proper clock signal.

The present invention can be used for any integrated circuit having a clock, timer, counter, or similar device. In a preferred embodiment, the invention used in a UART with the clock circuit providing the BAUD rate frequency.

For a fuller understanding of the nature and advantages of the invention, reference should be made to the following description taken in conjunction with the accompanying drawings.

DESCRIPTION OF THE PREFERRED EMBODIMENT

Figure 1:
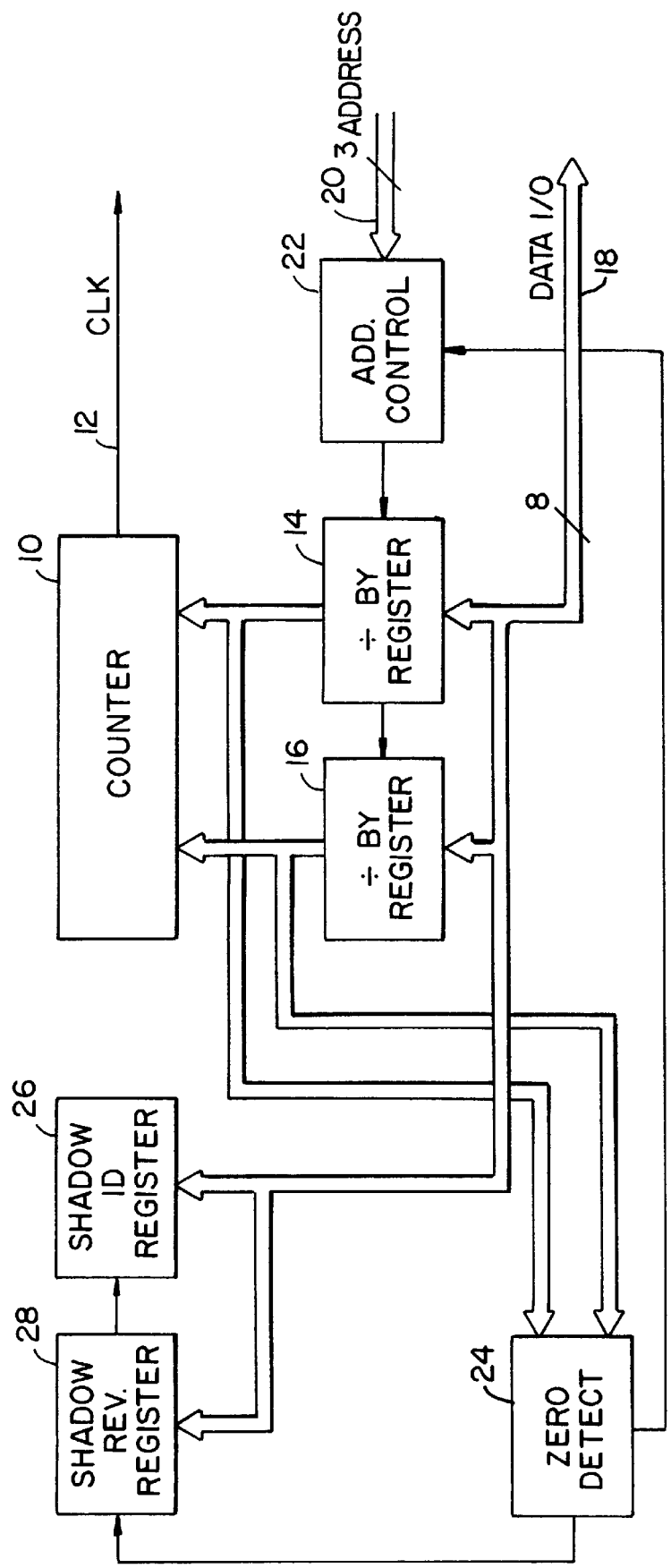
FIG. 1 is a block diagram of one embodiment of a circuit according to the present invention in which the shadow register is read on an invalid zero input to the clock register.

FIG. 1 is a block diagram of one embodiment of the present invention. FIG. 1 shows a portion of an integrated circuit having a counter 10 which produces a clock signal on a line 12. In one embodiment, line 12 is the BAUD rate for a UART device. The frequency of the clock is programmable by writing the appropriate values in a clock register, or divide-by register. In FIG. 1, this is two registers 14 and 16, each containing 8 bits. The data is written in on a data I/O bus 18. The registers are addressed by a 3-bit address bus 20, provided through address control circuitry 22 which selects the appropriate register to enable writing or reading in response to the address detected. The user can thus program the counter by inputting the appropriate data values to the registers 14 and 16.

The user can also read the values programmed into the register for verification or otherwise. Since a divide-by-zero operation is not permitted, entering zeroes into the registers is an illegal state. The present invention detects such an illegal state with a zero detect circuit 24. Upon detecting zeroes, zero detect circuit 24 will enable shadow registers 26 and 28 in sequence, outputting first the 8-bit ID value, and then the 8-bit revision value on data I/O bus 18. Thus, appropriate software can uses the illegal state to read out the ID and revision number using the same address as the clock registers. Thus, the ID and revision number can be read without requiring an additional register address, and without interfering with the operation of a program designed for older chips, since the zero state would not be used in such an older program because of its invalidity.

In one embodiment, the ID value in the 8 bits is a simple binary code in which all of the 8 bits are zero except for a one indicating the corresponding device. Thus, for example, bit 1 might correspond to a device 850 if it is turned on, while bit 2 would correspond to a device 852, etc. Similarly, for the revision number, all zeroes indicate revision zero, a bit in the first bit position indicates a revision one, a one in the second bit position indicates a revision two, etc.

Alternately, for more device ID values or with a lower register size, bits could be coded to provide more values per byte. Alternately, a single register could be used, with a lower portion being used for ID and the upper portion for revision, or with the two encoded together, or any other combination.

Figure 2:
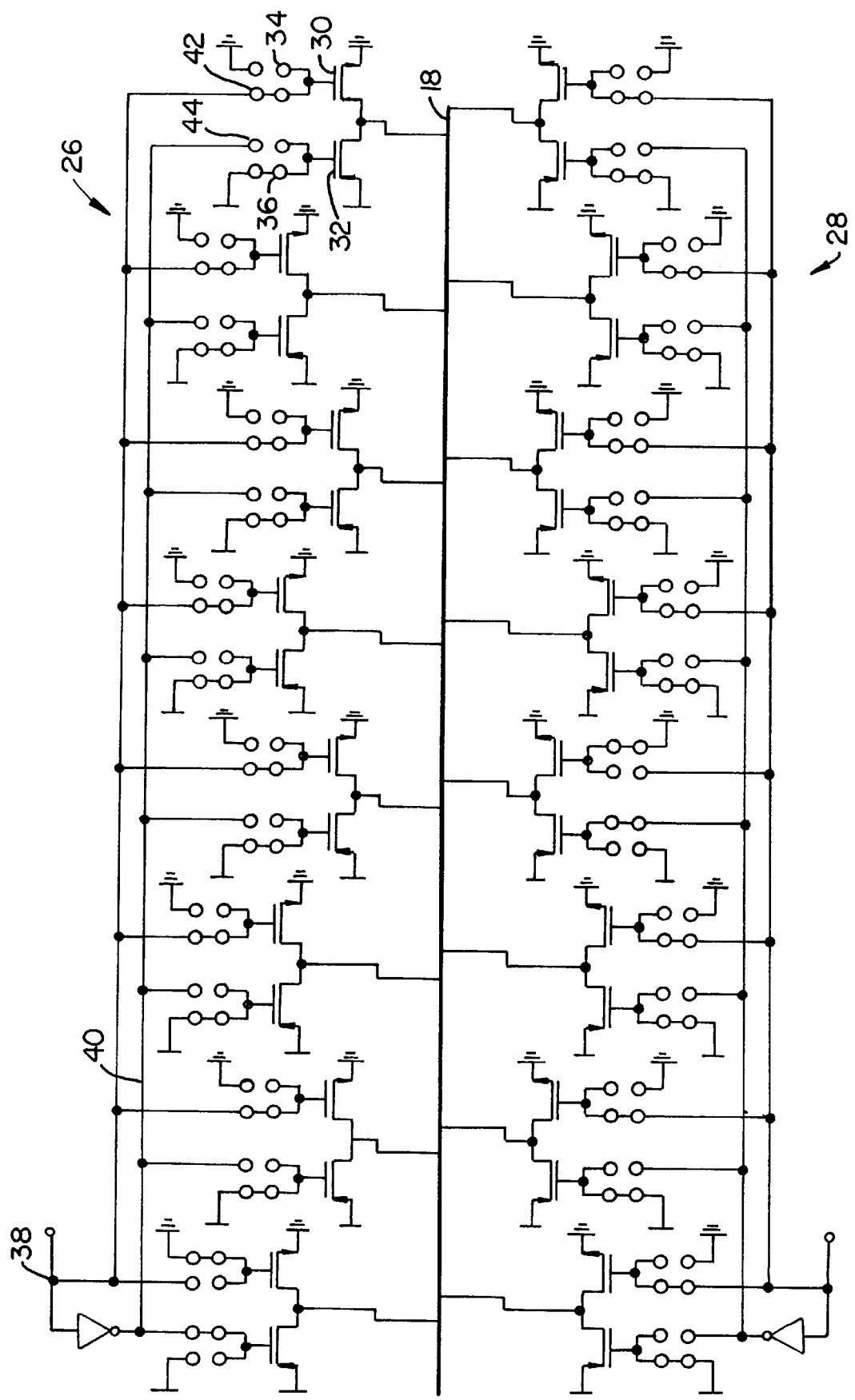
FIG. 2 is a circuit diagram of one embodiment of the shadow register of FIG. 1.

FIG. 2 is a diagram of one embodiment of shadow registers 26 and 28. Referring to register 26, 8-bit positions can be seen provided to data I/O bus 18. Each position has two transistors, such as transistors 30 or 32, which may be programmed to provide a zero value (transistor 30 connected to ground) or a one value (transistor 32 connected to the voltage supply). The bit value is programmed by providing a metalization connection from the appropriate transistor to either ground through connection 34 for transistor 30, or to the voltage supply through connection 36 for transistor 32. A read input line 38, and its inverted counterpart 40, are then either connected by metal or not through connections 42 and 44.

Figure 3:
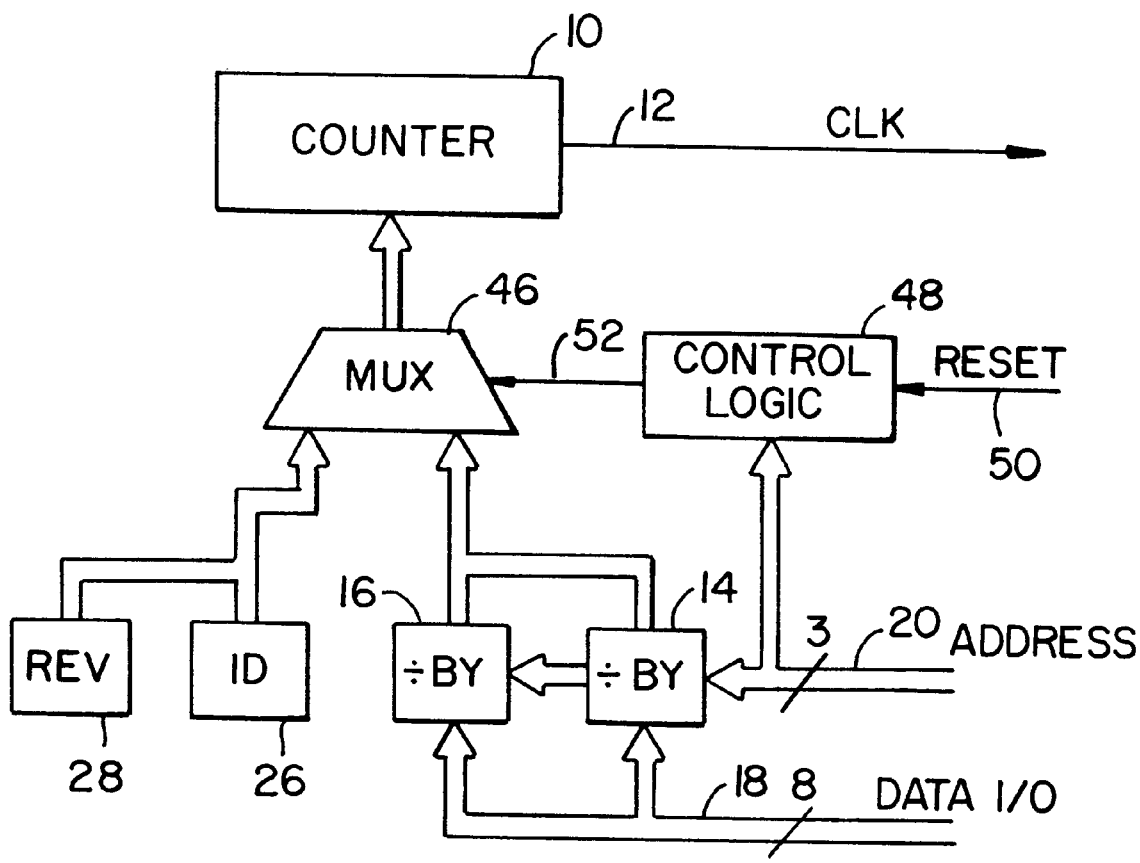
FIG. 3 is a block diagram of an alternate embodiment of the invention in which the device ID and revision number is determined from the output clock frequency.

FIG. 3 illustrates an alternate embodiment of the present invention. In FIG. 3, instead of shadow registers 26 and 28 being connected to data I/O bus 18, they are connected through a multiplexer 46 to counter 10. Control logic 48 detects a reset signal on reset line 50. When this happens, it provides a select signal on line 52 to multiplexer 46 to select the ID and revision values from registers 26 and 28 as the input to counter 10. Thus, the frequency of the clock on line 12 will be determined by the divide-by values set forth in the shadow registers. By measuring this clock frequency, software can then determine what the divide-by value was, and from that it can determine the device ID and revision number.

After reset, when the user writes a new value into registers 14 and 16, control logic 48 detects this, and selects the normal output of clock registers 14 and 16 and deselects the shadow registers using multiplexer 46. Control logic 48 can do this by detecting an address signal, detecting the write signal, detecting the data signal to the clock registers, or any combination.

In a preferred embodiment, the registers are programmed during the last metalization layer. Thus, level 2 metal in a 2-metal device would program the connections in the registers in FIG. 2.

The present invention may also be used to recognize whether a manufacturer is using shadow registers as in the present invention. Typically today, a manufacturer will provide a digital one output in response to an invalid zero data input to the clock divide-by registers. Thus, by reserving the one value in the first bit, if a one is generated, that means shadow registers are not present, and the device can't be read according to the present invention.

As will be understood by those skilled in the art, the present invention may be embodied in other specific forms without departing from the spirit or essential characteristics thereof. Accordingly, the foregoing description is intended to be illustrative, but not limiting, of the scope of the invention, which is set forth in the following claims.

What is claimed is:

1. An integrated circuit comprising:
a clock circuit;
a clock register for providing a programmable value to said clock circuit for use in determining a clock frequency;
a data input coupled to said clock register;
a shadow register for storing a device identification, said shadow register sharing an address with said clock register;
a data output coupled to said clock register and to said shadow register; and
a detect circuit coupled to said data input for detecting a predetermined data input value on said data input and enabling an output from said shadow register in response.

2. The integrated circuit of claim 1 wherein said data input and said data output are a combined data I/O bus.

3. The integrated circuit of claim 1 further comprising:
an address input; and
a control circuit for enabling said clock register in response to a clock register address on said address input;
said detect circuit disabling said clock register when said predetermined data input value is detected and said clock register address is detected.

4. The integrated circuit of claim 1 wherein said clock register stores a divide by value, and said predetermined data value is an illegal data state of zero.

5. The integrated circuit of claim 1 wherein said shadow register has a fixed value encoded during a metalization stage of manufacture of said integrated circuit.

6. The integrated circuit of claim 1 wherein said shadow register comprises first and second registers storing a device ID and a revision number.

7. The integrated circuit of claim 1 wherein said integrated circuit is a UART.

8. A UART integrated circuit comprising:
a clock circuit;
a clock register for providing a programmable divide by value to said clock circuit for use in determining a clock frequency;
a shadow register for storing a device identification, said shadow register sharing an address with said clock register;
a data I/O bus coupled to said clock register and said shadow register;
an address input;
a control circuit for enabling said clock register in response to a clock register address on said address input; and
a detect circuit coupled to said data I/O bus and said address input for detecting an illegal data state of zero and said clock register address, and enabling an output from said shadow register and disabling said clock register in response.

9. The integrated circuit of claim 8 wherein said shadow register has a fixed value encoded during a metalization stage of manufacture of said integrated circuit.

10. The integrated circuit of claim 8 wherein said shadow register comprises first and second registers storing a device ID and a revision number.

11. The integrated circuit of claim 8 wherein said integrated circuit is a UART.

12. A method for providing a device identification for an integrated circuit having a clock circuit, a clock register for providing a programmable value to said clock circuit for use in determining a clock frequency, and a data input coupled to said clock register, said method comprising the steps of:
storing a device identification in a shadow register, said shadow register sharing an address with said clock register; and
detecting a predetermined data input value on said data input and enabling an output from said shadow register in response.

13. The method of claim 12 further comprising the steps of:
   enabling said clock register in response to a clock register address; and
   disabling said clock register when said predetermined data input value is detected and said clock register address is detected.

14. The method of claim 12 wherein said clock register stores a divide by value, and said predetermined data value is an illegal data state of zero.

15. The method of claim 12 further comprising the step of encoding a fixed value in said shadow register during a metalization stage of manufacture of said integrated circuit.

16. The method of claim 12 wherein said shadow register comprises first and second registers and further comprising the step of storing a device ID and a revision number in said first and second registers.

17. A UART integrated circuit comprising:
   a clock circuit;
   a clock register for providing a programmable value to said clock circuit for use in determining a clock frequency;
   a shadow register for storing a device identification, said shadow register sharing an address with said clock register;
   a multiplexing circuit having an output coupled to said clock circuit, a first input coupled to an output of said clock register, and a second input coupled to an output of said shadow register;
   a reset input; and
   a control circuit coupled to said reset input and a select input of said multiplexing circuit, said control circuit detecting a reset signal on said reset input and providing a select signal to said multiplexing circuit to select an output from said shadow register in response.

18. The integrated circuit of claim 17 wherein said control circuit is further configured to select an output of said clock register after detecting a write to said clock register.

19. The integrated circuit of claim 17 wherein said shadow register has a fixed value encoded during a metalization stage of manufacture of said integrated circuit.

20. The integrated circuit of claim 17 wherein said shadow register comprises first and second registers storing a device ID and a revision number.

21. The integrated circuit of claim 17 wherein said integrated circuit is a UART.

22. A method for providing a device identification for a UART integrated circuit having a clock circuit and a clock register for providing a programmable value to said clock circuit for use in determining a clock frequency, said method comprising the steps of:
   storing a device identification in a shadow register, said shadow register sharing an address with said clock register; and
   detecting a reset signal and enabling an output from said shadow register to said clock circuit in response.

* * * * *